(12) United States Patent
Tateishi et al.

(10) Patent No.: US 8,485,054 B2
(45) Date of Patent: Jul. 16, 2013

(54) ELECTRICALLY DRIVEN LINEAR ACTUATOR

(75) Inventors: Koji Tateishi, Iwata (JP); Yoshinori Ikeda, Iwata (JP)

(73) Assignee: NTN Corporation, Osaka-shi (JP)

( * ) Notice: Subject to any disclaimer, the term of this patent is extended or adjusted under 35 U.S.C. 154(b) by 328 days.

(21) Appl. No.: 12/823,174

(22) Filed: Jun. 25, 2010

(65) Prior Publication Data

US 2010/0319477 A1    Dec. 23, 2010

Related U.S. Application Data

(63) Continuation of application No. PCT/JP2008/003959, filed on Dec. 25, 2008.

(30) Foreign Application Priority Data

Dec. 27, 2007  (JP) .................. 2007-337681

(51) Int. Cl.
  *F16H 3/06*    (2006.01)
  *F16H 27/02*   (2006.01)
  *F16H 29/02*   (2006.01)
  *F16H 29/20*   (2006.01)

(52) U.S. Cl.
  USPC ........................ 74/89.39; 74/89.23

(58) Field of Classification Search
  USPC ............................. 74/89.23, 89.39
  See application file for complete search history.

(56) References Cited

U.S. PATENT DOCUMENTS

| | | | | |
|---|---|---|---|---|
| 2,481,255 | A | * | 9/1949 | Stone ........................ 74/89.39 |
| 4,747,319 | A |   | 5/1988 | Sakuta |
| 5,058,445 | A |   | 10/1991 | Nilsson |
| 5,778,733 | A | * | 7/1998 | Stringer ........................ 74/527 |
| 6,722,485 | B1 | * | 4/2004 | Gitnes et al. ................ 192/223.1 |
| 2009/0090204 | A1 | * | 4/2009 | Jones et al. .................. 74/89.39 |

FOREIGN PATENT DOCUMENTS

| | | |
|---|---|---|
| DE | 36 42 938 | 6/1987 |
| EP | 0 258 571 | 3/1988 |
| JP | 60-241501 | 11/1985 |
| JP | 62-139767 | 6/1987 |
| JP | 63-047557 | 2/1988 |
| JP | 09-224348 | 8/1997 |
| JP | 2005-291480 | 10/2005 |

OTHER PUBLICATIONS

Machine Translation of JP 09-224348.*
Machine Translation of JP 09-224348, Aug. 1997.*

* cited by examiner

*Primary Examiner* — Justin Krause
(74) *Attorney, Agent, or Firm* — Harness, Dickey & Pierce, P.L.C.

(57) ABSTRACT

An electrically driven linear actuator has an actuator body with a ball screw to convert a rotational motion to a linear motion. An electric motor provides the rotational motion. A gear mechanism transmits rotational motion of the electric motor to the ball screw of the actuator body. A position holding mechanism holds the position of the ball screw of the actuator body by engaging teeth, specifically a space between adjacent teeth, of a gear forming the gear mechanism.

11 Claims, 2 Drawing Sheets

ELECTRICALLY DRIVEN LINEAR ACTUATOR

CROSS-REFERENCE TO RELATED APPLICATIONS

This application is a continuation of International Application No. PCT/JP2008/003959, filed Dec. 25, 2008, which claims priority to Japanese Application No. 2007-337681, filed Dec. 27, 2007. The disclosures of the above applications are incorporated herein by reference.

FIELD

The present disclosure relates to an electrically driven linear actuator used in a drive train, such as a brake, engine or transmission of an automobile and, more particularly, to an electrically driven linear actuator to convert a rotary motion of an electric motor to a linear motion via a ball screw mechanism.

BACKGROUND

In prior art linear actuators, the electric motor, supported on a housing, rotationally drives a ball screw shaft formed with a ball screw. The ball screw shaft axially drives an output member connected to a ball nut engaging the ball screw shaft. Friction on the ball screw is very low. Thus, the ball screw shaft can easily be rotated by an axial load acting on the output member. The linear actuator is incorporated with mechanism for holding a position of the output member, such as a brake of the electric motor or a power transmitting apparatus, using a worm gear with low mechanical efficiency.

It is necessary to use an electric motor with a large output in order to provide the motor with a braking function. Additionally, a continuous electric current must be supplied to the motor to generate a braking torque.

Furthermore, it is necessary to use a worm gear with a small lead angle when using a worm gear as a driving gear devoid of reverse rotation. However, the efficiency of a worm gear having a small lead angle is poor. Thus, the use of the ball screw becomes meaningless.

In Reference Patent Document 1 mentioned below, an electrically driven actuator is disclosed where an annular member is rotationally supported within a housing via bearings. A one-way clutch is arranged between the inner circumference of the housing and the outer circumference of the annular member. A ball screw shaft frictionally engages the annular member via friction members.

When the ball screw shaft is positively rotated by an electric motor, the one-way clutch is unlocked and the ball screw shaft is smoothly rotated to axially displace an output member, via a ball nut against an axial load. When the electric motor is stopped, a torque for rotating the ball screw shaft in a reverse direction acts on the ball screw shaft by the axial load acting on the output member. Although this torque acts on the annular member via the friction member, the annular member cannot rotate due to locking of the one-way clutch. Furthermore, the ball screw shaft frictionally engaging with the annular member, via the friction member, is prevented from rotating in a reverse direction by a frictional force acting on frictionally engaging portions between side faces of the friction member and their mating surfaces. When the electric motor is rotated in a reverse direction, the one-way clutch is maintained in a locked condition. However a torque transmitted from the electric motor is applied to the frictionally engaging portion in addition to the torque caused by the axial load. As a result, a slippage is caused in the frictionally engaging portions and the ball screw shaft is rotated. Thus, it is possible to displace the output member in the axial load direction.

According to the prior art electrically driven linear actuator, it is possible to hold the output member stationary against the axial load during stoppage of the electric motor as described above. In addition, continuous supply of electric current to the electric motor is not required in order to generate the braking torque in the electric motor. Additionally, the use of an electric motor having a specially large output is not required. Reference Patent document 1: Japanese Laid-open Patent Publication No. 291480/2005.

However, in the prior art electrically driven linear actuator, the positioning of the output member during stoppage of an electric motor is basically based on frictionally engaging force of the friction member and thus is unstable. Although it is possible to arrange the position holding mechanism on the ball screw mechanism itself, the space for arranging the position holding mechanism is limited due to circulation of the balls.

SUMMARY

It is therefore an object of the present disclosure to provide an electrically driven linear actuator that can positively hold the position of an output member during stoppage of an electric motor.

In order to achieve the object of the present disclosure, an electrically driven linear actuator comprises an actuator body with a ball screw to convert a rotational motion to a linear motion. An electric motor and a gear mechanism transmit a rotational motion of the electric motor to the ball screw. The electrically driven linear actuator has a position holding mechanism engaging with teeth, more specifically, a space between adjacent teeth, of a gear forming the gear mechanism to hold the position of the ball screw.

The electrically driven linear actuator has a position holding mechanism engaging with teeth of a gear that forms the gear mechanism to hold the position of the ball screw. Thus, it is possible to positively hold the position of the ball screw with the rotation of the gear being positively stopped by the position holding mechanism. More particularly, the position holding mechanism is formed so that the rotation of the gear is positively stopped by engaging a tooth, or teeth, forming the gear mechanism. Thus, any slippage that would be caused in the engaging surfaces of the prior art friction engagement mechanism is eliminated by the position holding mechanism of the present disclosure. Accordingly, it is possible to stably hold the position of the output member of the ball screw under a condition where a vibration load is applied to the ball screw actuator.

The position holding mechanism comprises a locking member adapted to be engaged with and disengaged from the gear. A driving mechanism drives the locking member into its engaging and disengaging directions relative to the gear. This enables teeth of the gear to be positively engaged by the locking member. The driving mechanism is a solenoid. This enables the locking member to be driven by a simple mechanism.

The locking member is a shaft of the solenoid. This reduces the number of structural parts to a minimum.

The locking member is driven along a tooth trace of the gear. This enables the locking member to positively engage with teeth of the gear.

The gear of the gear mechanism is directly connected to the electric motor. The driving mechanism of the locking member is controlled based on a signal of the "Z" phase of a motor encoder of the electric motor. Thus, the Z phase of the motor encoder matches the phase of the teeth of the gear. This makes it possible to determine the timing for driving the locking member, from the signal of the Z phase, so that it corresponds to a position between mutually adjacent gear teeth.

The driving mechanism of the locking member is controlled when the electric motor has reached a rotational speed less than a certain value as well as a target position deviation less than a certain value. This positively engages the locking member with teeth of the gear without incurring cost.

The driving mechanism is controlled so that the locking member is reciprocally driven several times while driving the electric motor by several pulses when the locking member fails to engage the gear. This makes it possible to positively engage the locking member with the gear.

The electrically driven linear actuator of the present disclosure comprises an actuator body with a ball screw to convert a rotational motion to a linear motion. An electric motor and a gear mechanism transmit a rotational motion of the electric motor to the ball screw. The electrically driven linear actuator further comprises a position holding mechanism engaging with teeth of a gear that forms the gear mechanism to hold the position of the ball screw. Thus, it is possible to positively hold the position of the ball screw while the rotation of the gear is positively stopped by the position holding mechanism. More particularly, the position holding mechanism is formed so that the rotation of the gear is positively stopped by engaging a tooth (or teeth). Thus, any slippage that would be caused by the engaging surfaces of the prior friction engagement mechanism is eliminated by the position holding mechanism of the present disclosure. Accordingly, it is possible to stably hold the position of the output member or ball screw of the actuator body under a condition where a vibration load is applied to the ball screw actuator.

An electrically driven linear actuator comprises an actuator body with a ball screw to convert a rotational motion to a linear motion. An electric motor and a gear mechanism transmit a rotational motion of the electric motor to the ball screw. The electrically driven linear actuator further comprises a solenoid to hold the position of the ball screw with engaging teeth of a gear forming the gear mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A preferred embodiments of the present disclosure will be hereinafter described with reference to the drawings.

Figure 1:
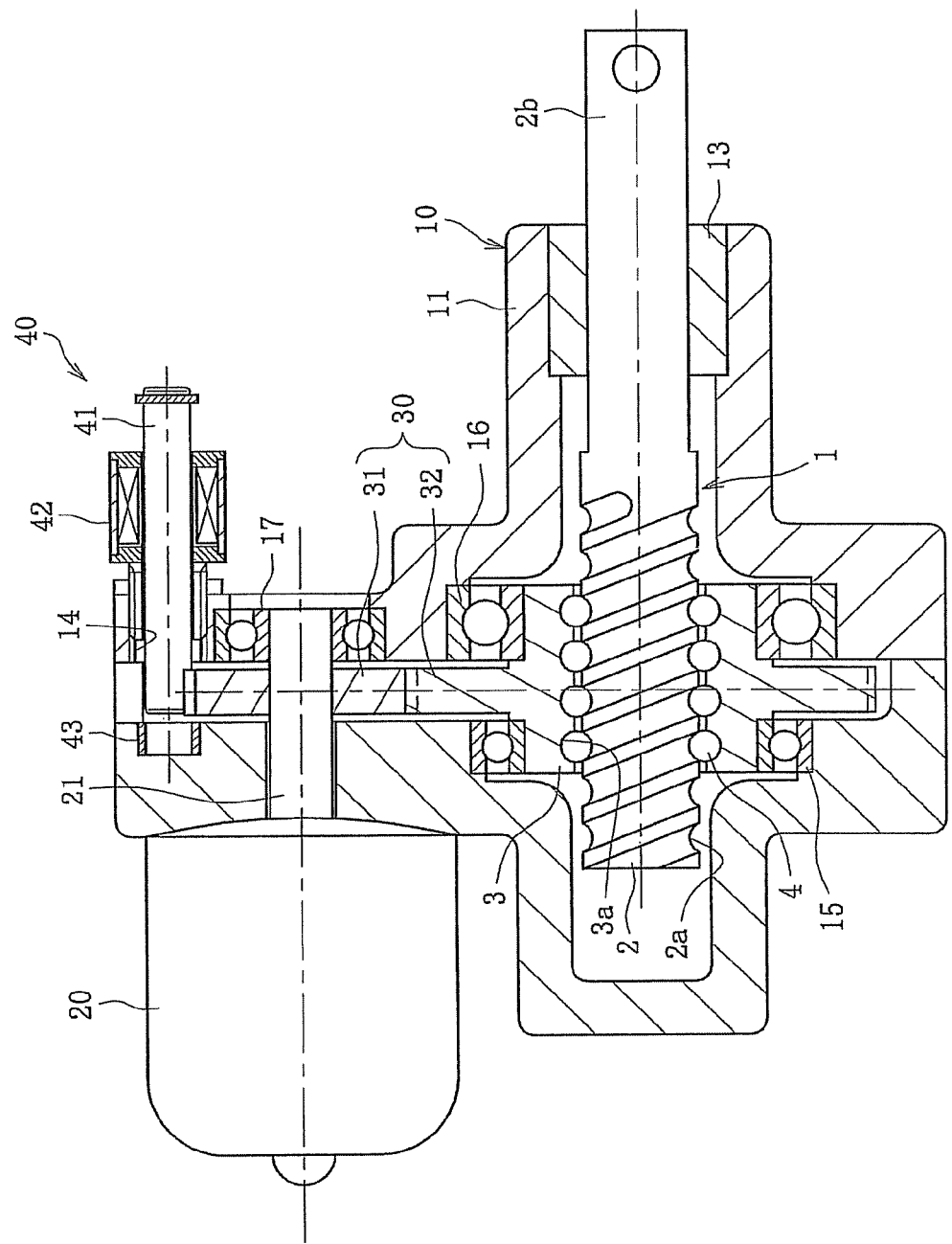
FIG. 1 is a longitudinal section view of an electrically driven linear actuator.
Figure 2:
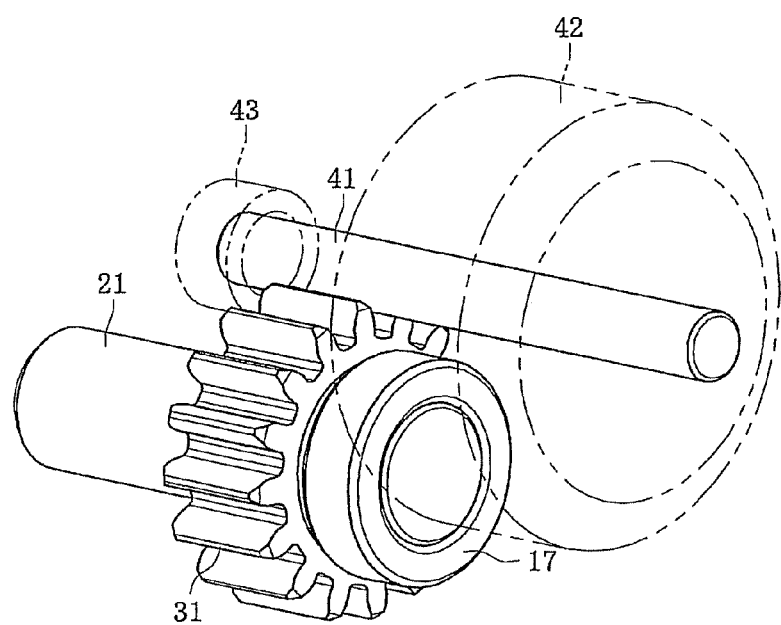
FIG. 2 is a perspective view of a relationship between a solenoid and a gear of FIG. 1.

FIG. 1 is a longitudinal section view of an electrically driven linear actuator of the present disclosure. FIG. 2 is a perspective view of a relationship between a solenoid and a gear of FIG. 1.

As shown in FIG. 1 the electrically driven linear actuator comprises an actuator body 10 with a ball screw 1 to convert a rotational motion to a linear motion. An electric motor 20 is coupled with the actuator body 10. A gear reduction mechanism 30 transmits a rotational motion of the electric motor 20 to the ball screw 6. A position holding mechanism 40 holds the position of the ball screw 1 of actuator body 10 by engaging teeth of a first gear 31 forming the gear reduction mechanism 30.

The ball screw 1 includes a screw shaft 2 formed with a helical screw groove 2a on its outer circumference. A nut 3, engaging the screw shaft 2, is formed with a screw groove 3a on its inner circumference. A plurality of balls 4 are rollably contained in a rolling way formed between opposite helical screw grooves 2a, 3a. The balls 4 are circulated by a known circulating mechanism such as a returning tube, a bridge member etc. through the rolling way.

The actuator body 10 includes a housing 11. The nut 3 is rotationally supported by a pair of rolling bearing 15, 16 in the housing 11. The screw shaft 2 is supported by the housing 11. The screw shaft 2 is able to axially move relative to the housing 11 but unable to rotate relative to the housing 11. The nut 3 is driven by the electric motor 20 via the gear reduction mechanism 30 to axially move the screw shaft 2.

The screw shaft 2 has a portion formed with the screw groove 2a. The screw groove 2a has a predetermined length extending from one end of the screw shaft 2. An opposite end portion of the screw shaft 2 is not formed with any screw groove and projects from the housing 11 as an output shaft portion 2b. This output shaft portion 2b is supported in the housing 11 via a guide 13. Thus, the screw shaft portion 2b cannot rotate relative to the housing 11 but can axially move therealong.

The electric motor 20 is mounted on the housing 11. The motor shaft 21 is arranged parallel to the screw shaft 2. The motor shaft 21 is supported by a rolling bearing 17.

The gear mechanism 30 includes a first gear 31 and a second gear 32. The first gear 31 is a smaller spur gear secured on the motor shaft 21 of the electric motor 20. The second gear 32 is a larger spur gear mating with the first gear 31. The second gear 32 is formed on the outer circumference of a flanged portion arranged on the axial middle of the nut 3. The pair of rolling bearings 15, 16 supporting the nut 3 is arranged on either side of the second gear 32.

The position holding mechanism 40 includes a shaft 41 and a solenoid 42. The shaft 41 functions as a locking member engagable with the first gear 31. The solenoid 42 functions as a driving mechanism for driving the shaft 41. Thus, the shaft 41 can engage teeth, more specifically a space between adjacent teeth, of the first gear 31. The shaft 41 is a straight rod member extending along a tooth trace of the gear 31. The shaft 41 is linearly driven by the solenoid 42 so that a tip of the shaft or locking member 41 is received in a recess 43 in the housing 11.

The solenoid 42 is screwed into a mounting aperture 14. The mounting aperture 14 is formed on a side of the housing 11 opposite to the electric motor 20. Although it is illustrated that the shaft 41 passes through a bore in the solenoid 42, this is only to show an idea that the shaft 41 is linearly driven by an electromagnetic force of the solenoid 42 and does not show a concrete structure of the solenoid 42.

The solenoid 42 generally includes a stationary iron core secured on the solenoid body. A movable iron core is adapted to be driven in and out from the solenoid body. A spring urges the movable iron core away from the stationary iron core. The movable iron core is adapted to be magnetically attracted toward the stationary iron core against a spring force when the electric power is "ON". On the contrary, the movable iron core is returned to its initial position away from the stationary iron core by a spring force when the electric power is "OFF". The stationary iron core, movable iron core and spring are omitted from the illustrated example. In fact, the shaft 41 is secured to the movable iron core and is moved together with the movable core. Of course it is possible to construct the position holding mechanism 40 so that the shaft 41 can project when the electric power is "ON" and returned to its initial position by a spring force when the electric power is "OFF". On the contrary, it can return when power is "ON" and project by a spring force when power is "OFF" based on a relationship of positions of the movable iron core and the stationary core.

In addition it may be possible to use a permanent magnet when using a solenoid of a self-holding type so that the shaft projects when the power is "ON". The projected position is maintained by the permanent magnet, this saves electric power. The shaft is returned by a spring force when the power is "OFF". In this case, it may be possible to supply a release current, in short time, to cancel energy of the permanent magnet on returning of the shaft. On the contrary, it may be possible to construct the solenoid so that the shaft is returned when the power is "ON". The return position is maintained by the permanent magnet, this saves electric power. The shaft is projected by a spring force when the power is "OFF". In this case it may be possible to supply a release current, in short time, to cancel energy of the permanent magnet on projection of the shaft.

The holding of position of the output shaft portion 2b is performed as shown in FIG. 1. The shaft 41 projects into a space between adjacent teeth of the first gear 31 to stop its rotation at a timing of a desired holding position. According to the present disclosure a desired position of the output shaft portion 2b can be stably held under a condition where vibration is applied to the linear actuator. This is due to the fact that the rotation of the first gear 31 is positively prevented by the shaft 41 without any fear of slippage that is often caused in frictional engaged surfaces of the electrically driven linear actuator of the prior art. Since the shaft 41 can be sufficiently decelerated by the ball screw 1 and the gear mechanism 30, the torque applied to the shaft 41 is small and thus the shaft 41 can be operated by a small solenoid 42.

The driving control of the shaft 41 should be performed under a best timing relative to the position of the first gear 31. This is performed as follows:

(1) The electric motor 20 and the first gear 31 are directly connected to each other. In this case, when the "Z" phase of a motor encoder is known, it is possible to match the projecting position of the shaft 41 to a position (space) between adjacent teeth of the first gear 31 by controlling the solenoid 42 based on a signal of the Z phase. Thus, the Z phase of the motor encoder matches the phase of the teeth of the gear.

(2) If the shaft 41 cannot extend passing through the space between adjacent teeth of the first gear 31, the projecting operation of the shaft 41 is repeated several times by controlling the solenoid 42 several times while causing stepping rotation of the motor by several pulses so that the shaft 41 can pass through the space between adjacent teeth of the first gear 31.

(3) The electric motor 20 is controlled so that it is stopped by gradually reducing its speed when the motor 20 arrives at a predetermined target position. Accordingly the solenoid 42 is controlled so that the shaft 41 repeats its projecting operation, several times, to pass through the space between adjacent teeth of the first gear 31. When the electric motor 20 has reached a rotational speed less than a certain value as well as a target position deviation less than a certain value, the shaft 41 is inserted into the space between adjacent teeth of the first gear 31. Thus, the holding position of the output shaft portion 2b can be achieved after repeating the projecting operation of the shaft 41.

In the operations (2) and (3) described above, it will be of course appreciated that the projecting operation of the shaft 41 could be succeeded by only one time. Although the matching of the phases is achieved based on the Z phase in the operation (1), there will be a case that the matching cannot be achieved by one time. Thus, the repeat control as in operations in (2) and (3) may be adopted. The most advantageous operation in cost is that of (3).

FIG. 2 is an enlarged view of a condition where the shaft 41 has passed through the space between adjacent teeth of the first gear 31.

A tip of the shaft 41 can be received in the recess 43 to firmly support the shaft so that it can bear against a moment load applied by the first gear 31.

Although it is illustrated and described that shaft 41 itself of the solenoid 42 is directly inserted into the space of adjacent teeth of the first gear 31, a similar function may be achieved by providing a key-shaped locking member on the housing 11 and sliding the locking member by the solenoid 42. This makes it possible to use a solenoid having a least sufficient strength and to more easily insert the key-shaped locking member into a space between gear teeth. Thus, this achieves a positive position holding of an output member. In addition, the gear to be locked may be the second gear 32 instead of the first gear 31.

In addition, although it is illustrated and described as a type where the nut 3 is driven by the electric motor 20 via the gear reduction mechanism 30 to cause a linear motion of the screw shaft 2, it will be appreciated that the present disclosure may be applied to a linear actuator having an adverse relationship of a type where a screw shaft is driven by an electric motor via a gear reduction mechanism to cause a linear motion of a nut.

Furthermore, it is possible to use various kinds of driving mechanisms to drive the locking member other than a solenoid. In the present embodiment, although it is described and illustrated that the locking member is driven along a tooth trace of the gear being parallel with the rotational axis of the gear, it is possible to drive the locking member in a direction orthogonal to the rotational axis of the gear to engage the space between adjacent teeth of the gear.

The present disclosure can be applied to electrically driven actuators used in automobiles.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electrically driven linear actuator comprising:
   an actuator body including a ball screw to convert a rotational motion to a linear motion;
   an electric motor coupled with the actuator body;
   a gear mechanism transmitting a rotational motion of the electric motor to the ball screw;
   a position holding mechanism for holding the position of the ball screw in the actuator body, the position holding mechanism engages with teeth of a gear forming the gear mechanism; and the position holding mechanism further comprises a locking member adapted to engage and disengage the space between adjacent teeth of the gear, and a driving mechanism for driving the locking member into its engaging and disengaging directions relative to the gear and the locking member is driven along a tooth trace of the gear.

2. The electrically driven linear actuator of claim 1, wherein the driving mechanism is a solenoid.

3. The electrically driven linear actuator of claim 1, wherein the locking member is a shaft of the solenoid.

4. The electrically driven linear actuator of claim 1, wherein the driving mechanism of the locking member is controlled when the electric motor has reached a rotational speed less than a certain rotational speed value as well as a target position deviation less than a certain deviation value.

5. An electrically driven linear actuator comprising:
an actuator body including a ball screw to convert a rotational motion to a linear motion;
an electric motor coupled with the actuator body;
a gear mechanism transmitting a rotational motion of the electric motor to the ball screw;
a position holding mechanism for holding the position of the ball screw in the actuator body, the position holding mechanism engages with teeth of a gear forming the gear mechanism;
the position holding mechanism further comprises a locking member adapted to engage and disengage the space between adjacent teeth of the gear, and a driving mechanism for driving the locking member into its engaging and disengaging directions relative to the gear;
the gear of the gear mechanism is directly connected to the electric motor, and the driving mechanism of the locking member is controlled based on a signal of a Z phase of a motor encoder of the electric motor so that the Z phase of the motor encoder matches to the phase of the teeth of the gear.

6. The electrically driven linear, actuator of claim 5, wherein the driving mechanism is controlled so that the locking member is reciprocally driven several times while driving the electric motor by several pulses when the locking member fails to engage the gear.

7. The electrically driven linear actuator of claim 5, wherein the driving mechanism is a solenoid.

8. The electrically driven linear actuator of claim 7, wherein the locking member is a shaft of the solenoid.

9. An electrically driven linear actuator comprising:
an actuator body including a ball screw to convert a rotational motion to a linear motion;
an electric motor coupled with the actuator body;
a gear mechanism transmitting a rotational motion of the electric motor to the ball screw;
a position holding mechanism for holding the position of the ball screw in the actuator body, the position holding mechanism engages with teeth of a gear forming the gear mechanism;
the position holding mechanism further comprises a locking member adapted to engage and disengage the space between adjacent teeth of the gear, and a driving mechanism for driving the locking member into its engaging and disengaging directions relative to the gear;
the driving mechanism of the locking member is controlled when the electric motor has reached a rotational speed less than a certain rotational speed value as well as a target position deviation less than a certain deviation value; and
the driving mechanism is controlled so that the locking member is reciprocally driven several times while driving the electric motor by several pulses when the locking member fails to engage the gear.

10. The electrically driven linear actuator of claim 9, wherein the driving mechanism is a solenoid.

11. The electrically driven linear actuator of claim 10, wherein the locking member is a shaft of the solenoid.

* * * * *

UNITED STATES PATENT AND TRADEMARK OFFICE
CERTIFICATE OF CORRECTION

| | |
|---|---|
| PATENT NO. | : 8,485,054 B2 |
| APPLICATION NO. | : 12/823174 |
| DATED | : July 16, 2013 |
| INVENTOR(S) | : Koji Tateishi et al. |

Page 1 of 1

It is certified that error appears in the above-identified patent and that said Letters Patent is hereby corrected as shown below:

In the Claims

Column 7

Line 37, claim 6    "linear," should be --linear--

Signed and Sealed this
Twenty-fourth Day of December, 2013

Margaret A. Focarino
*Commissioner for Patents of the United States Patent and Trademark Office*